(12) United States Patent
Morrison

(10) Patent No.: US 6,345,387 B1
(45) Date of Patent: Feb. 5, 2002

(54) COHERENT OBJECT SYSTEM ARCHITECTURE

(75) Inventor: Gordon E. Morrison, Westminster, CO (US)

(73) Assignee: COSA Technologies, Inc., Denver, CO (US)

( * ) Notice: Subject to any disclaimer, the term of this patent is extended or adjusted under 35 U.S.C. 154(b) by 0 days.

(21) Appl. No.: 09/302,940

(22) Filed: Apr. 30, 1999

Related U.S. Application Data

(60) Provisional application No. 60/083,779, filed on Apr. 30, 1998.

(51) Int. Cl.$^7$ .............................................. G06F 9/445
(52) U.S. Cl. ................................ 717/11; 717/1; 717/2; 717/5
(58) Field of Search .............................. 717/1, 11, 2, 5; 709/318; 714/38; 700/86

(56) References Cited

U.S. PATENT DOCUMENTS

| | | | |
|---|---|---|---|
| 5,339,430 A | 8/1994 | Lundin et al. | 709/332 |
| 5,590,271 A | 12/1996 | Klinker | 395/763 |
| 5,598,564 A * | 1/1997 | Barker, III | 717/5 |
| 5,692,122 A * | 11/1997 | Bird | 714/38 |
| 5,983,016 A * | 11/1999 | Brodsky et al. | 717/1 |
| 5,995,753 A * | 11/1999 | Walker | 717/2 |
| 6,038,378 A * | 3/2000 | Kita et al. | 395/183.14 |
| 6,138,171 A * | 10/2000 | Walker | 709/318 |
| 6,167,319 A * | 12/2000 | Harris et al. | 700/86 |
| 6,269,049 B1 * | 7/2001 | Weinfrutner | 365/233 |

FOREIGN PATENT DOCUMENTS

| | | |
|---|---|---|
| EP | 0 889 401 A2 | 7/1999 |

OTHER PUBLICATIONS

Title: Transforming control–flow intensive designs to facilitate power management, author: Lakshminarayana et al, ACM., 1998.*
Title: Improving Data–Flow analysis with Path Profiles, author: Ammons et al, ACM, 1998.*
Title: An overview of hierarchical control flow graph model, author: Fritz et al, ACM, 1995.*
McConnell, Steven C., "Code Complete: A Practical Handbook of Software Construction" (Microsoft Press, 1993.)

* cited by examiner

Primary Examiner—Mark R. Powell
Assistant Examiner—Chameli C. Das
(74) Attorney, Agent, or Firm—Blakely, Sokoloff, Taylor & Zafman LLP

(57) ABSTRACT

A method and apparatus are provided for controlling the execution of a software program. According to one embodiment, control flow information including multiple states associated with a software program is made accessible. Each of the states includes information indicative of desired control flow of the software program and information indicative of desired behavior of the software program. A determination is made if a current status of the software program has a predetermined relationship with an expected state of execution of the software program. Based upon the result of the determination and the information indicative of desired behavior, the software program is caused to perform an action and caused to transition from the current state to a next state. According to another embodiment, specification of a control flow architecture associated with a software program is simplified to the provision of certain control flow information that is accessible to a control flow engine. The control flow information need only include information indicative of desired control flow of the software program and information indicative of desired behavior of the software program.

72 Claims, 15 Drawing Sheets

Bytecode Interpreter 100

```
1   public static void execute ( byte bytecode[ ] ) {
2       int pc = 0;                                          // 'program counter'
3       while ( true ) {
4           int opcode = bytecode [ pc ];                    // get inst from bytecode
5           switch ( opcode ) {                              // switch on its type
6           case OPC_PUTS:                                   // inst to print a string
7
8               int len = bytecode [ pc + 1 ];               // next byte is a length
9
10              for ( i = 1; i <= len; i++ ) {
11                  printChar ( bytecode [ pc+1 ] );         // print out len # of bytes
12              }                                            // end for
13
14              pc = pc + len + 1;                           // advance pc to next inst
15              break;                                       // end OPC_PUTS
16
17          //
18          // many more cases ...
19          //
20
21          case OPC_EXIT
22              return;                                      // return from program
23          }                                                // end switch
24      }                                                    // end while
25  }                                                        // end execute
```

Figure 1 (Prior Art)

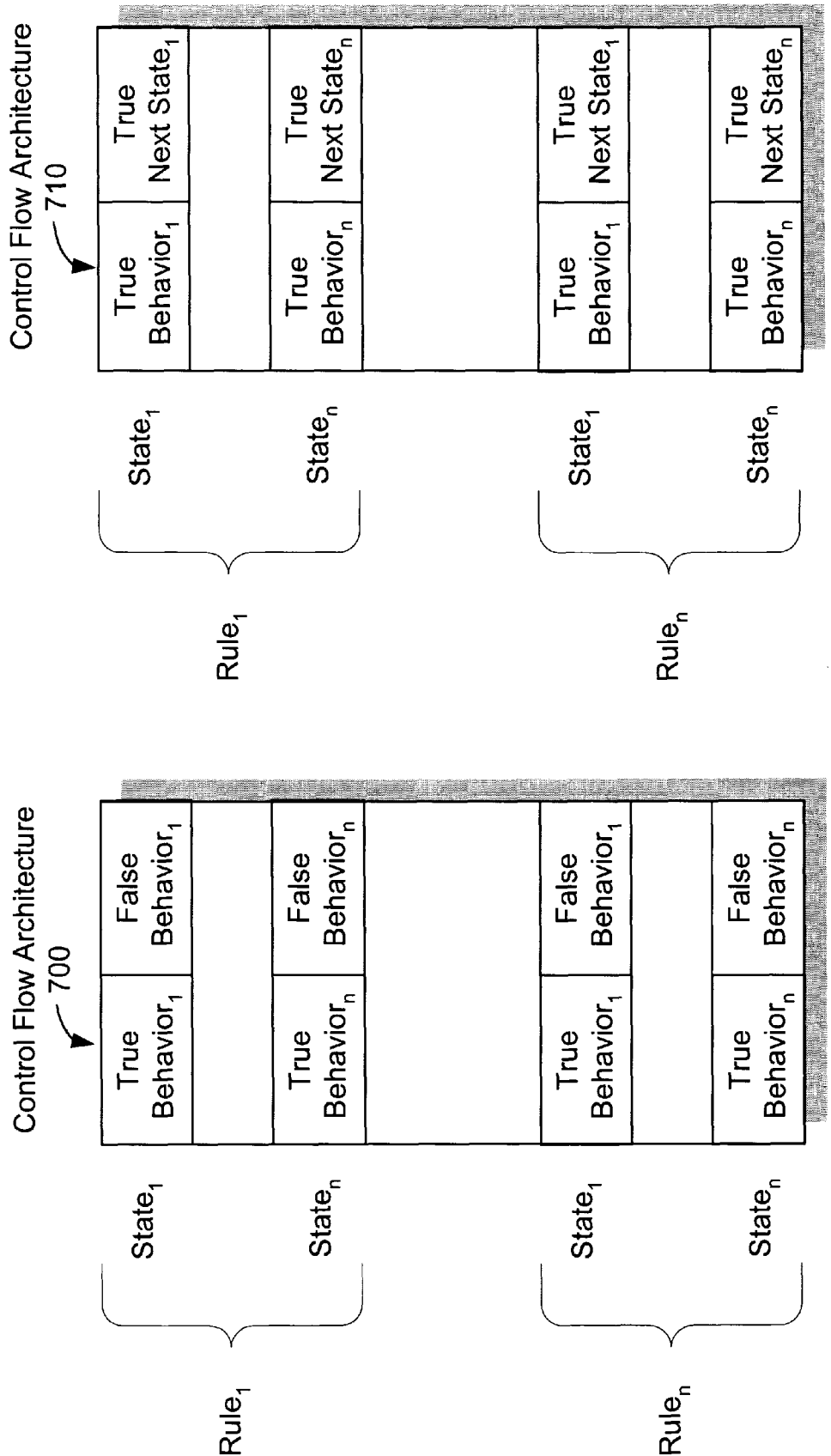

Control Flow Information 800

```
1  // COSA.BUILTTM * COSA.BUILTTM * COSA.BUILTTM * COSA.BUILTTM
2  // Copyright COSA Technologies, Inc. 1998. All Rights Reserved.
3  // (COSA.BUILT is a trademark or registered trademark of COSA Technologies, Inc.)
4  // COSA.BUILTTM * COSA.BUILTTM * COSA.BUILTTM * COSA.BUILTTM
5
6  // Explicit User Definitions
7  // E_Commerce
8  #include "stdafx.h"
9  class aDialog;
10 class aE_Commerce;
11 #include "resource.h"
12 #include "aDialog.h"
13 #include "aE_Commerce.h"
14 #include "sE_Commerce.h"
15 #define Cs(o,t,ho,mo,hm,mm,e) o,t,ho,mo,hm,mm,e
16
17 struct aE_Commerce::aE_Commerce_Tbl CppTbl[] = {
18 //
19 // Ordinal
20 // Rule    Expected    True         True                                  False        False                                 True        False       Trace
21 // Name    State       Behavior     "TrueMember"                          Behavior     "FalseMember"                         State       State       Value
22 // "oRule" "sState"    "TrueBehavior"                                     "FalseBehavior"                                    "TrueRule"  "FalseRule" "oTraceRule"
23 //
24 //
25 {Cs( oProduct, sEnterName,    &aE_Commerce::mEnterName,        &aE_Commerce::mError,       oProduct + 1,  oError + 0,  0  )},
26 {Cs( 1,        sEnterCost,    &aE_Commerce::mEnterCost,        &aE_Commerce::mError,       oProduct + 2,  oError + 1,  1  )},
27 {Cs( 2,        sEnterTaxRate, &aE_Commerce::mEnterTaxRate,     &aE_Commerce::mError,       oProduct + 3,  oError + 2,  2  )},
28 {Cs( 3,        sCalcTotal,    &aE_Commerce::mCalcTotal,        &aE_Commerce::mError,       oProduct + 4,  oError + 1,  3  )},
29 {Cs( 4,        sReturnTotalCost, &aE_Commerce::mReturnTotalCost, &aE_Commerce::mError,    oDone + 0,     oError + 4,  4  )},
30 {Cs( oDone,    sDoneExit,     &aE_Commerce::mDoneExit,         &aE_Commerce::mError,       oError + 0,    oError + 0,  5  )},
31 {Cs( oError,   sNameError,    &aE_Commerce::mDispNameError,    &aE_Commerce::mDispError,   oDone + 0,     oDone + 0,   6  )},
32 {Cs( 1,        sCostError,    &aE_Commerce::mDispAmountError,  &aE_Commerce::mDispError,   oDone + 0,     oDone + 0,   7  )},
33 {Cs( 2,        sTaxRateError, &aE_Commerce::mTaxRateError,     &aE_Commerce::mDispError,   oDone + 0,     oDone + 0,   8  )},
34 {Cs( 3,        sTaxCalcError, &aE_Commerce::mDispTaxCalcError, &aE_Commerce::mDispError,   oDone + 0,     oDone + 0,   9  )},
35 {Cs( 4,        sReturnAmountError, &aE_Commerce::mDispAmountError, &aE_Commerce::mDispError, oDone + 0,  oDone + 0,   10 )},
36 };   // End Rules
37 // End Control Flow Information
```

Figure 8

Control Flow Engine
900

```
1   void aE_Commerce::StartE_Commerce( void ) {
2       oRule = oProduct;                                              // Rule initialization
3       sToken = sEnterProductName;                                    // Program Status initialization ("Current Status")
4       eE_Commerce = sRun;                                            // Engine Status initialization
5       while( eE_Commerce ) {
6           if ( sToken == CppTbl[oRule].sState ) {                    // Compare Current Status to Expected State
7               Code_Trace((CppTbl[oRule].oTraceRule));                // Trace Transitions
8               (this->*(CppTbl[oRule].TrueMember))();                 // Perform True Behavior
9               oRule = CppTbl[oRule].TrueRule;                        // Transition to True Next State
10          } else {
11              Code_Trace((-CppTbl[oRule].oTraceRule));               // Trace Transitions
12              (this->*(CppTbl[oRule].FalseMember))();                // Perform False Behavior
13              oRule = CppTbl[oRule].FalseRule;                       // Transition to False Next State
14          }                                                          // end if
15      }                                                              // end while
16  }                                                                  // end engine
```

Figure 9

Member Functions 1000

```
1   aE_Commerce::aE_Commerce(aDialog *DialogObj_){
2       DialogObj = DialogObj_;
3       oRule = 0;
4       sToken = CppTbl[CppTbl[oRule].TrueRule].sState;
5   }
6
7   void aE_Commerce::mStartE_Commerce(void) {
8       sToken = CppTbl[CppTbl[oRule].TrueRule].sState;
9   }
10
11  void aE_Commerce::mEnterName(void) {
12      DialogObj->mGetName(ProductName_);
13      ProductName = ProductName_;
14      sToken = CppTbl[CppTbl[oRule].TrueRule].sState;
15  }
16
17  void aE_Commerce::mEnterCost(void) {
18      DialogObj->mGetCost(ProductCost_);
19      ProductCost = atof(ProductCost_);
20      Gross = ProductCost ;
21      TaxPaid = 0 ;
22      sToken = CppTbl[CppTbl[oRule].TrueRule].sState;
23  }
24
25  void aE_Commerce::mEnterTaxRate(void) {
26      DialogObj->mGetTaxRate(TaxRate_);
27      TaxRate = atof(TaxRate_);
28      TaxPaid = Gross * TaxRate ;
29      sToken = CppTbl[CppTbl[oRule].TrueRule].sState;
30  }
31
32  void aE_Commerce::mReturnTotalCost(void) {
33      TotalCost_.Format("%f",TotalCost);
34      DialogObj->mCalculateTax(TotalCost_);
35      sToken = CppTbl[CppTbl[oRule].TrueRule].sState;
36  }
37
38  void aE_Commerce::mDispError(void) {
39      MessageBox(0,"Error nErrorCode","Message",MB_OK);
40      sToken = CppTbl[CppTbl[oRule].TrueRule].sState;
41  }
42
43  void aE_Commerce::mError(void) {
44      eE_Commerce = 0;
45      nError = CosaError;
46      sToken = CppTbl[CppTbl[oRule].TrueRule].sState;
47  }
48
49  void aE_Commerce::mDoneExit(void) {
50      eE_Commerce = 0;
51      sToken = CppTbl[CppTbl[oRule].TrueRule].sState;
52  }
53
54  void aE_Commerce::mDispNameError(void) {
55      sToken = CppTbl[CppTbl[oRule].TrueRule].sState;
56  }
57
58  void aE_Commerce::mDispAmountError(void) {
59      sToken = CppTbl[CppTbl[oRule].TrueRule].sState;
60  }
61
62  void aE_Commerce::mDispTaxCalcError(void) {
63      sToken = CppTbl[CppTbl[oRule].TrueRule].sState;
64  }
65
66  void aE_Commerce::mCalculateTotal(void) {
67      TotalCost = Gross + TaxPaid ;
68      sToken = CppTbl[CppTbl[oRule].TrueRule].sState;
69  }
70
71  void aE_Commerce::mTaxRateError(void) {
72      sToken = CppTbl[CppTbl[oRule].TrueRule].sState;
73  }
74
75  // COSA Internal Generation
76  void aE_Commerce::mTrueIgnore(void) {
77      sToken = CppTbl[CppTbl[oRule].TrueRule].sState;
78  }
79
80  void aE_Commerce::mFalseIgnore(void) {
81      sToken = CppTbl[CppTbl[oRule].FalseRule].sState;
82  }
83
84
```

Figure 10

COHERENT OBJECT SYSTEM ARCHITECTURE

This application claims the benefit of U.S. Provisional Application No. 60/083,779, filed Apr. 30, 1998, which is incorporated herein by reference.

This file contains a CD-ROM containing electronic copies of Appendices, A, B, C and D which are incorporated herein by reference.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of run-time execution engines and automated code generation. More particularly, the invention relates to a Coherent Object System Architecture (COSA) including a context free run-time execution engine and a control flow architecture useful for directing the execution of automatically and/or manually generated code.

2. Description of the Related Art

Current run-time execution engines are characterized by complicated chains of logic and inefficiency. FIG. 1 is a simplified example of a prior art run-time execution engine that interprets bytecodes for a Java virtual machine. Assuming the bytecode interpreter 100 is to support even a subset of the 200+different instructions that make up such a virtual machine, the switch-case statement beginning at line 5 becomes large rather quickly. For purposes of this example, behavior is shown for only two exemplary opcodes, OPC_PUTS and OPC_EXIT.

Briefly, according to the present example, each bytecode that is received causes the bytecode interpreter 100 to sequentially interpret and process each byte in the bytecode parameter. Depending upon the sophistication of the compiler, the effect of the large switch-case statement is often the same as if a set of if-then-elses had been coded. For instance, chains of tests would be required for the $100^{th}$ opcode before arriving at the corresponding behavior. First, the interpreted opcode is compared to the first case, then the opcode is compared to the second case, and so on, until a successful comparison is made to the $100^{th}$ case. One possible way to achieve more efficiency is to manipulate the switch-case statements in an intelligent manner. For example, the case statements may be arranged in an order that first evaluates those of the opcodes that are most commonly used or those that are able to be evaluated the fastest. Consequently, fewer tests will be performed during run-time and the code will execute faster. Of course, this shallow, code-tuning advice assumes run-time characteristics of the code to be executed can be anticipated with some level of certainty. In reality, the manner in which general purpose software will be exploited is far from predictable. As a result, unforeseen uses may hinder the intended optimizations and may actually degrade performance for some users.

Other limitations illustrated by this example include lack of maintainability and inflexibility both of which result from context dependencies. For example, when new opcodes are added, the bytecode interpreter 100 must be supplemented with multiple new case statements and it must be recompiled. In addition, prior art run-time execution engines have various other disadvantages that are overcome by aspects of the present invention, as described in the detailed description which follows.

BRIEF SUMMARY OF THE INVENTION

A method and apparatus are described for controlling the execution of a software program. According to a first embodiment, control flow information including multiple states associated with a software program is made accessible. Each of the states includes information indicative of desired control flow of the software program and information indicative of desired behavior of the software program. A determination is made if a current status of the software program has a predetermined relationship with an expected state of execution of the software program. Based upon the result of the determination and the information indicative of desired behavior, the software program is caused to perform an action and caused to transition from the current state to a next state.

According to a second embodiment, specification of a control flow architecture associated with a software program is simplified to the provision of certain control flow information that is accessible to a control flow engine. The control flow information need only include information indicative of desired control flow of the software program and information indicative of desired behavior of the software program.

According to a third embodiment, a novel controller is provided. The controller includes a processor configured to execute instructions and a memory coupled to the processor. The memory has stored therein data representing sequences of instructions of a software program. The sequences of instructions when executed by the processor cause the processor to perform the steps described above for controlling the execution of the software program. In one embodiment, the controller is dynamically programmable allowing data representing one or more member functions, control flow information, and/or a control flow engine to be loaded into the memory.

According to a fourth embodiment, a run-time execution engine performs true dynamic binding. The run-time execution engine dynamically binds execution flow of a software program to one or more member functions of the software program by reading addresses of the one or more member functions out of a data segment of the software program.

According to a fifth embodiment of the present invention, an array may be initialized with dissimilar elements. An expansion macro replaces each function in an array of functions with a list of dissimilar parameters associated with the function. Additionally, addresses associated with one or more parameters are calculated as the expansion macro replaces the functions.

According to a sixth embodiment, an improved method of running a Java program is provided. A bytecode is received. If the bytecode has not previously been received, then the bytecode is translated into executable code, the executable code is run, and the executable code is stored. Otherwise, if the bytecode has previously been received, then the previously stored executable code for the bytecode is executed.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIG. 1 is a simplified example of a prior art run-time execution engine.

FIGS. 7A, 7B, 7C, 7D, and 7E conceptually illustrate control flow information components according to alternative embodiments of the present invention.

FIG. 8 is an exemplary implementation of control flow information according to one embodiment of the present invention.

FIG. 9 is an exemplary implementation of a control flow engine according to one embodiment of the present invention.

FIG. 10 illustrates exemplary member functions according to one embodiment of the present invention.

DETAILED DESCRIPTION OF THE INVENTION

Figure 2:
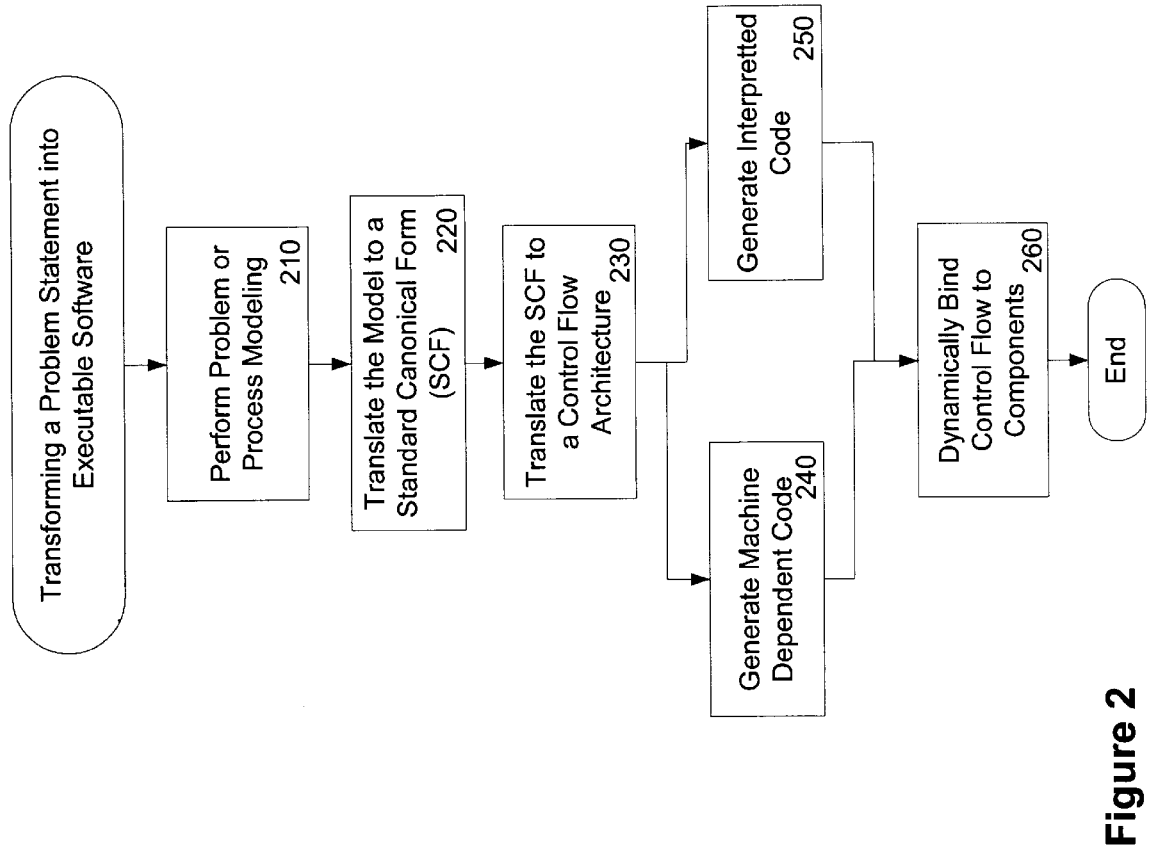
FIG. 2 is a high level flow diagram that conceptually illustrates steps involved in transforming a problem statement into executable software.

A method and apparatus for controlling the execution of a software program are described. Broadly stated, according to the present invention, a software program may be specified as a control flow architecture and data flow information. Exemplary control flow architecture may include control flow information in the form of a table comprising rule states including desired control flow and desired behavior. According to one embodiment, the data flow information may comprise one or more member functions associated with the control flow information. During execution of the software program, an engine may cause one of the member functions to carry out the desired behavior based upon the current execution status of the program and the control flow information. In this manner, the engine may direct the execution of the software program by dynamically binding control flow to the software program components during run-time. According to another aspect of the present invention, the control flow information facilitates production of error free code and promotes good coding practices by forcing the model to consider desired behavior for all possible states of the software program. These and other enhancements seek to provide a powerful and flexible run-time system for automatically and/or manually generated code.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Importantly, while embodiments of the present invention will be described with reference to an exemplary C++ implementation, the method and apparatus described herein are equally applicable to other types of software, hardware, and hybrid implementations.

Terminology

Before describing the context in which various embodiments of the present invention may be employed, some terms that will be used throughout this application will briefly be defined.

A "class" typically defines data, data types, and operations on the data. The realization of a specific case of a class or classes is an instance of the class or classes which is referred to as an "object."

According to one embodiment, a class comprises the definition of one or more "program elements" including an engine, control flow information, and one or more member functions.

An "engine" is code that dynamically determines the "execution flow" of a software program by navigating through the control flow structure of the program element.

The control flow structure of a program element is typically defined in terms of centralized control flow information comprising one or more collections of states, referred to as "rules." Each state may include information indicative of desired behavior and/or desired state transitions. Although embodiments of the present invention will be described with reference to a particular table structure referred to as the Coherent Object Table (COTable), no particular organization of the control flow information is required in terms of data structure. Various other data structures, such as databases of relational data, tree structures, linked lists, and the like, may be employed. In the past, control flow information has resided in the code segment of a software program and was therefore static. However, according to one embodiment of the present invention, control flow information may reside in the data segment of a software program thereby allowing it to be modified during run-time.

In contrast to the relatively static control flow information, "execution flow" refers to the dynamic flow of execution during run-time. That is, execution flow is what happens during run-time, e.g., the actual paths taken through the various branches of the software program code.

Objects or their program elements may communicate with each other preferably by a "member function" of one calling the engine of another. Member functions are routines that implement the behavior associated with a particular state. According to one embodiment, member functions are invoked by an associated control flow engine by way of the control flow information. For example, the address of the desired member function may be dynamically bound based upon the current status of the execution of a software program. Alternatively, the control flow information may be statically bound. For example, the control flow information may comprise a virtual table (v-table) containing the addresses of the member functions.

"Status" typically refers to dynamic state information. For example, information concerning the condition or circumstances of the software program, e.g., current status, or an engine, e.g., engine status, at a particular instance in time. Hereinafter, "current status" will refer to the current status of the software program being directed unless otherwise indicated.

The meaning of the term "state" depends upon the context of its usage. In the context of a variable, e.g., expected state, state refers to a relatively static indication of the condition or circumstances of an engine or the software program. In contrast, when used with reference to a table of control flow information, such as a COTable, a state refers to a table entry, e.g., a row or column of the table.

An "attribute" of a state is information associated with the state. For example, in the context of a COTable, an attribute is an element of a table entry, e.g., a behavior, an expected state, a trace value, next state, the address of a behavior, the ordinal of the next state, etc.

"Binding" commonly refers to the resolution of addresses in a software program. Herein, the phrase "dynamic binding" refers to repeated binding that takes place during run-time as opposed to during the linking and loading stages of software generation, for example, when source code is converted into executable software. According to one embodiment dynamic binding is achieved by allowing a run-time execution engine to execute out of the data segment of the executable software program.

"Context Free" as it is used herein refers to the control flow engines being independent of the particular software program that they direct. That is, no application information is embedded in the control flow engines. All information for directing the execution flow of the software program is preferably contained within the control flow information and/or the member functions.

Overview: Transformation of a Problem Statement into Executable Software

While not limited to the field of automatic code generation, various aspects of the present invention are particularly useful in connection with achieving this objective/goal. Therefore, to put the present invention in context, it may be helpful to describe the process of transforming a problem statement/specification into executable software with reference to FIG. 2. At step 210, problem or process modeling is performed. In order to create a solution to a problem, or to automate a process, there must first typically be a clear statement of the problem or process. The problem/process statement should enumerate all processing procedural requirements and associated information relevant to the problem and necessary to perform the processing. An exemplary problem specification is illustrated in Appendix A. Tools are currently available for some problem domains that can automate the specification of a problem or process model. However, the use of such tools is not necessary to achieving automated code generation nor is it necessary to utilization of embodiments of the present invention.

At step 220, the model generated during step 210 may be translated into a Standard Canonical Form (SCF) to describe the problem or process as a grammar, or set of rules. According to one embodiment, the SCF is Backus-Naur Form (BNF) also referred to as Backus-Normal Form. An exemplary BNF specification is illustrated in Appendix B.

At step 230, the SCF is translated into a control flow architecture that defines the flow of control for the software program. Importantly, generation of an SCF, such as BNF is not required. Many other ways of generating the control flow architecture, both automated and manual exist. For example, a classical state table approach, such as used in circuit design, may be employed. In any event, the means by which the control flow architecture is generated is of little consequence so long as a logically coherent and consistent representation can be produced. As will be discussed in more detail below, the control flow architecture may be defined in terms of a centralized data structure. Preferably, the centralized data structure allows run-time navigation by a run-time execution engine.

In alternative embodiments, control flow architecture generation need not take place. Rather, the SCF may be translated into one of several different forms, such as a compiler for converting high-level programming language statements into machine-readable object code. Also, the control flow architecture may be manually generated.

In general, code may be created for use on a variety of platforms or targeted for a particular platform. At step 240, machine dependent code is generated. For example, data representing the control flow architecture and sequences of instructions for navigating the control flow architecture may be compiled, linked and loaded with a development tool set for execution on a particular processor architecture. Alternatively, at step 250, interpreted code may be generated. Regardless of the type of code, executable code or interpreted code, control flow may be dynamically bound to the software program components at run-time during step 260.

The focus of the present application will be on various elements of a software program, embedded hardware controller, or hybrid that accomplish step 260. However, it is important to note that various aspect of the present invention are useful completely separate and apart from automatic code generation and execution. For example, COSA may be used to enforce one or more desirable software engineering disciplines or methodologies thereby enforcing good coding practices and facilitating program correctness and the generation of error-free code to be generated.

Current software engineering methodologies tend to focus primarily on gathering information about the project to be developed. The information is sorted and ordered into models and a requirements document. The model and requirements document are then "thrown over the wall" to the development team. While the development team may employ a set of standards for writing the code, typically each programmer creates an independent architectural structure in their own style. Consequently, ten ad hoc developers will produce ten different coding styles for the same problem.

COSA places the emphasis on subject matter knowledge, e.g., telling the story of how the business works, and structure rather than technical knowledge. The format of the requirements document is dictated by the structure of the control flow information, e.g., the Coherent Object Table. In this manner, COSA may serve as an enforcement mechanism for good coding practices. Exemplary software engineering rules for COSA are illustrated in Appendix C.

As will be discussed further below, a COTable may contain two or more columns and as many rows as the problem's solution requires. COSA also specifies the structure of a novel run-time execution engine, referred to as the control flow engine, which provides iterative control for the software program and the rules for implementing member functions, e.g., Coherent Object Members.

An Exemplary Computer System

Figure 3:
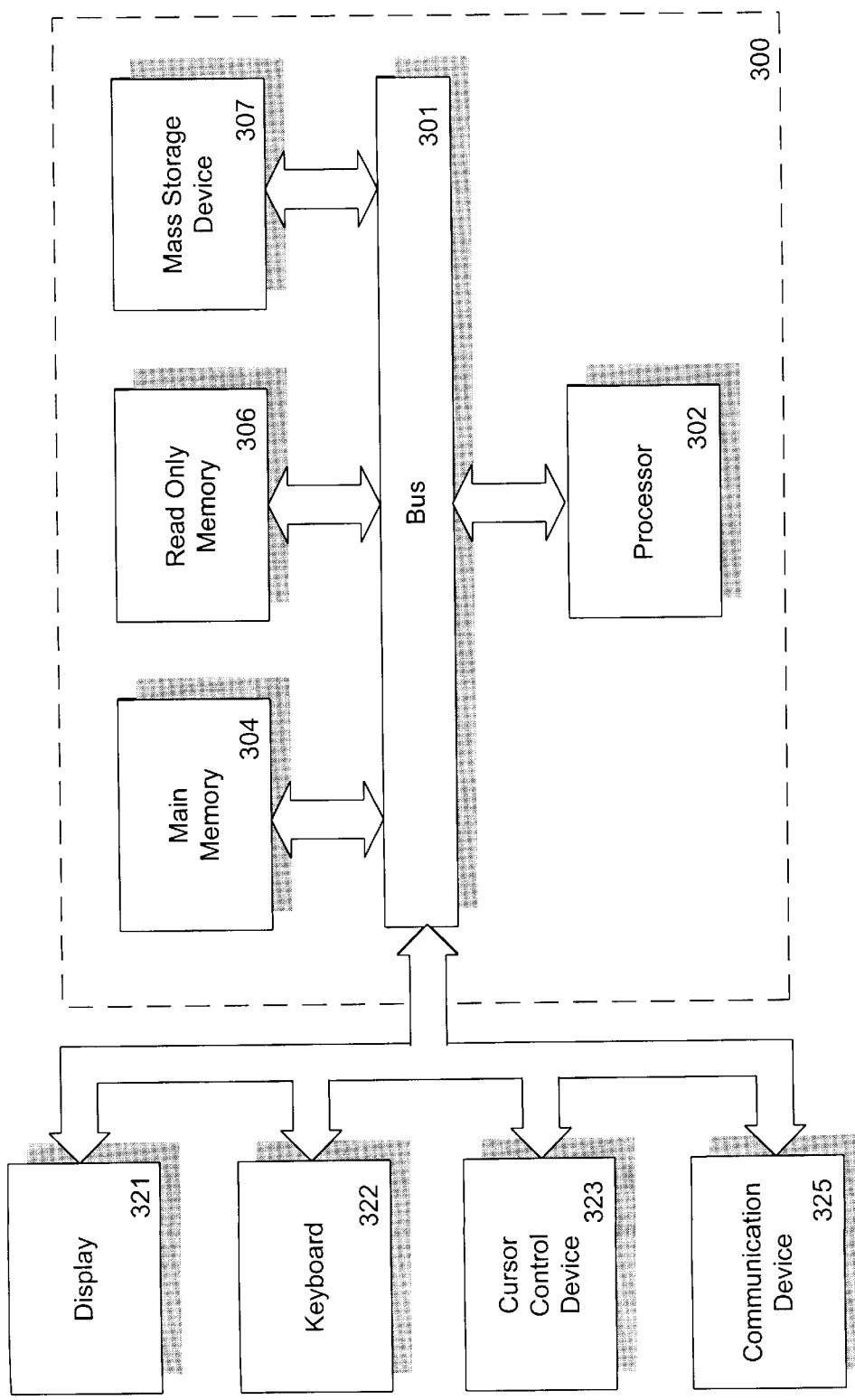
FIG. 3 is an example of a computer system upon which one embodiment of the present invention may be implemented.

Having briefly described the context in which the present invention may be employed, an exemplary machine in the form of a computer system 300 in which features of the present invention may be implemented will now be described with reference to FIG. 3. Computer system 300 comprises a bus or other communication means 301 for communicating information, and a processing means such as processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302.

A data storage device 307 such as a magnetic disk or optical disc and its corresponding drive may also be coupled to computer system 300 for storing information and instructions. Computer system 300 can also be coupled via bus 301 to a display device 321, such as a cathode ray tube (CRT) or Liquid Crystal Display (LCD), for displaying information to a computer user. For example, a GUI may facilitate problem or process modeling or results of executing an automatically generated software program may be presented on the display device 321.

Typically, an alphanumeric input device 322, including alphanumeric and other keys, is coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

A communication device 325 is also coupled to bus 301 for providing access from/to clients/servers via the Internet, for example. The communication device 325 may include a modem, a network interface card, or other well known interface devices, such as those used for coupling to Ethernet, token ring, or other types of networks. In any event, in this manner, the computer system 300 may be coupled to a number of clients/servers via a conventional network infrastructure, such as an enterprise's Intranet (e.g., WAN) and/or the Internet, for example.

The present invention is related to the use of computer system 300 to direct the execution of a software program that is manually or automatically generated using a particular set of disciplines discussed herein. As computer system 300 executes the software program, the processor 302 may access control flow information stored in a COTable within main memory 304, ROM 306, or other storage device to determine the desired control flow of the software program. Importantly, the present invention is not limited to having all engines, control flow information, or member functions located on the same computer system. Rather, individual objects, program elements, or portions thereof may be spread over a distributed network of computer systems. Additionally, it is appreciated that a lesser or more equipped computer system than the example described above may be desirable for certain implementations. Therefore, the configuration of computer system 300 will vary from implementation to implementation depending upon numerous factors, such as price constraints, performance requirements, and/or other circumstances. For example, according to one embodiment of the present invention, an embedded controller may comprise only a processor and a memory for storing static or dynamically loaded instructions and/or data.

An Exemplary Software Program Architecture

Figure 4:
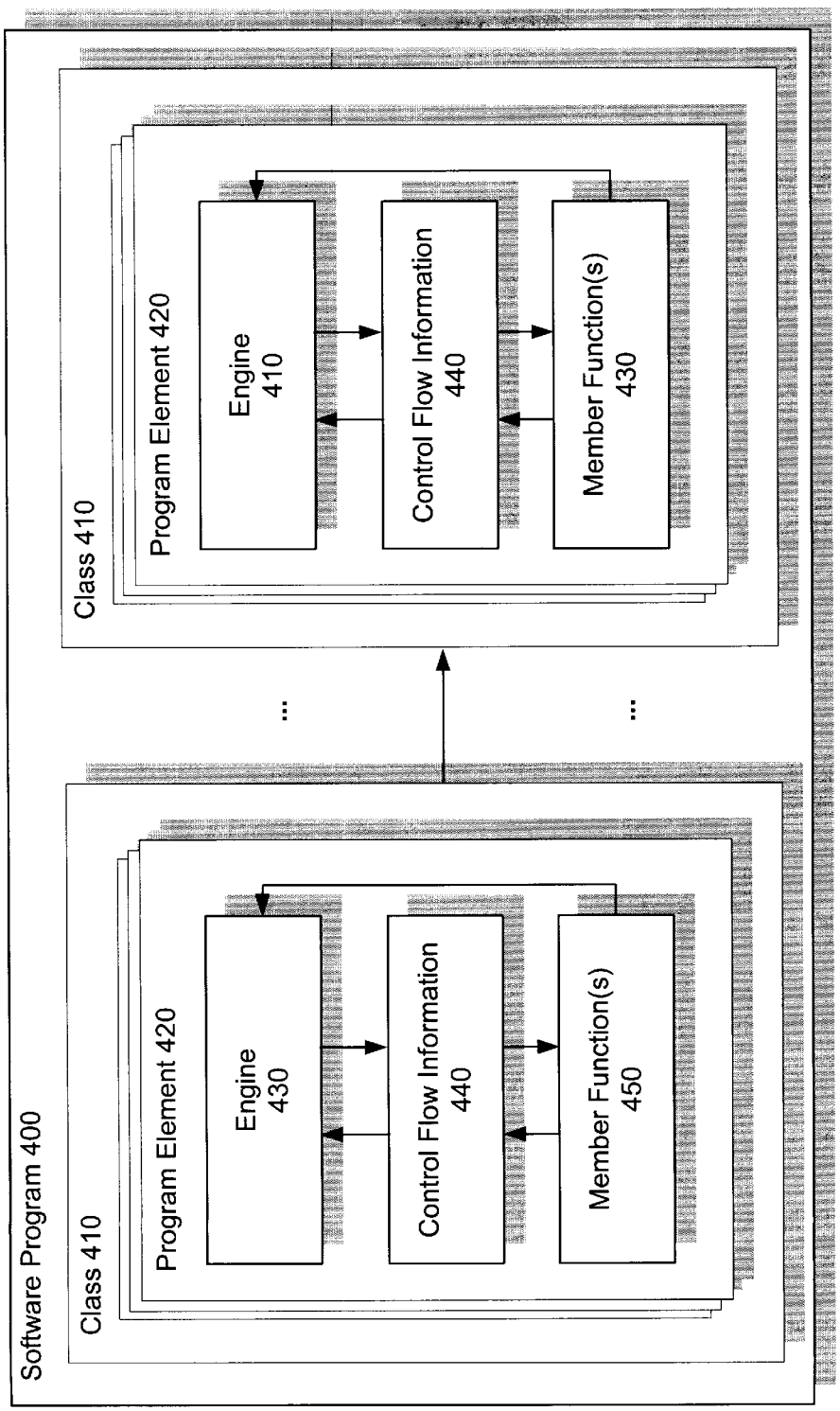
FIG. 4 conceptually illustrates the components of a software program according to one embodiment of the present invention.

FIG. 4 conceptually illustrates the components of a software program 400 according to one embodiment of the present invention. A software program may be specified in terms of a collection of control flow and data flow information. According to this example, this information is distributed among one or more classes 410. The classes 410 typically define a collection of data and the routines that act on the data. In this example, the routines and data may be represented by one or more program elements 420. Each program element further includes an engine 430, control flow information 440, and one or more member functions 450. Briefly, as will be discussed further below, the engine 430 may cause a particular execution flow as a result of control flow defined by the control flow information 440. In addition, data flow may be provided by the member function(s) 450.

According to one embodiment, the engine 430 serves as a driver or main loop providing iterative control for the software program and implementing the rules for determining whether or not to invoke member function(s) 450 based upon the control flow information 440.

In one embodiment of the present invention, the software program 400 may be implemented as a table-driven method that allows information to be looked up in a data structure, such as a multi-dimensional lookup table or a database of relational information, rather than using logic statements, such as if-then-elses and switch-case statements. As will be described further below, in this manner, code size can be greatly reduced and increased run-time efficiency can be achieved.

At any rate, the engine 430 may interface with the control flow information 440 to receive information about a rule associated with the current execution status of the software program 400. Based upon the rule and its relationship with the current execution status of the software program, the flow of execution and flow of control of the software program may be determined.

The control flow information 440 may additionally provide the engine 430 with information for direct and/or indirect access to the member function(s) 450. For example, as one feature of the present invention, the control flow information may comprise a table of addresses of member functions thereby providing the engine 430 with access to the member function(s) 450 through dynamic bindings at run-time.

The member function(s) 450 are routines that may implement behavior(s) associated with a particular state of the software program 400. The member function(s) also provide data flow. By way of illustration, the member function(s) 450 may perform state testing and updating state information associated with the execution of the software program 400.

According to one embodiment, member function(s) are invoked by the engine 430 by way of the control flow information 440. For example, the control flow information may include addresses of one or more of the member function(s) 450 and the address of the appropriate member function may be bound at run-time (e.g., true dynamic binding) based upon the status of execution of the software program. Alternatively, traditional static binding approaches may be employed in which case the control flow information 440 may comprise a virtual table (v-table) containing the addresses of one or more of the member function(s) 450. The member function(s) 450 may also provide status to the engine 430 by returning such information through the class structure, for example. As will be described further below, as an additional feature of the present embodiment, member function(s) 450 may optionally modify the control flow information 440 thereby affecting the future flow of the software program. Finally, it is important to understand that (instances of) classes 410 or their program elements 420 may communicate with each other. While, in terms of good coding practices, it may be preferable to limit such communication to a member function 450 of one (instance of) a class 410 calling the engine 430 of another, in alternative embodiments, this communication may be between any two program elements 420. For example, the control flow information 440 of one class 410 may specify a member function of another class 410, an engine 430 of one class 410 may invoke an engine 430 of another class 410, etc. Further details regarding the engine 430, the control flow information 440, and the member function(s) 450 are be provided below.

The use of state objects provides for reentrancy. That is, state objects allow the instantiation and dynamic assignment of new and different control flow information 440 to new state objects at run-time, while permitting continuing use of previous control flow information 440 for existing state objects.

Exemplary Control Flow Information Representation

Figure 5A:
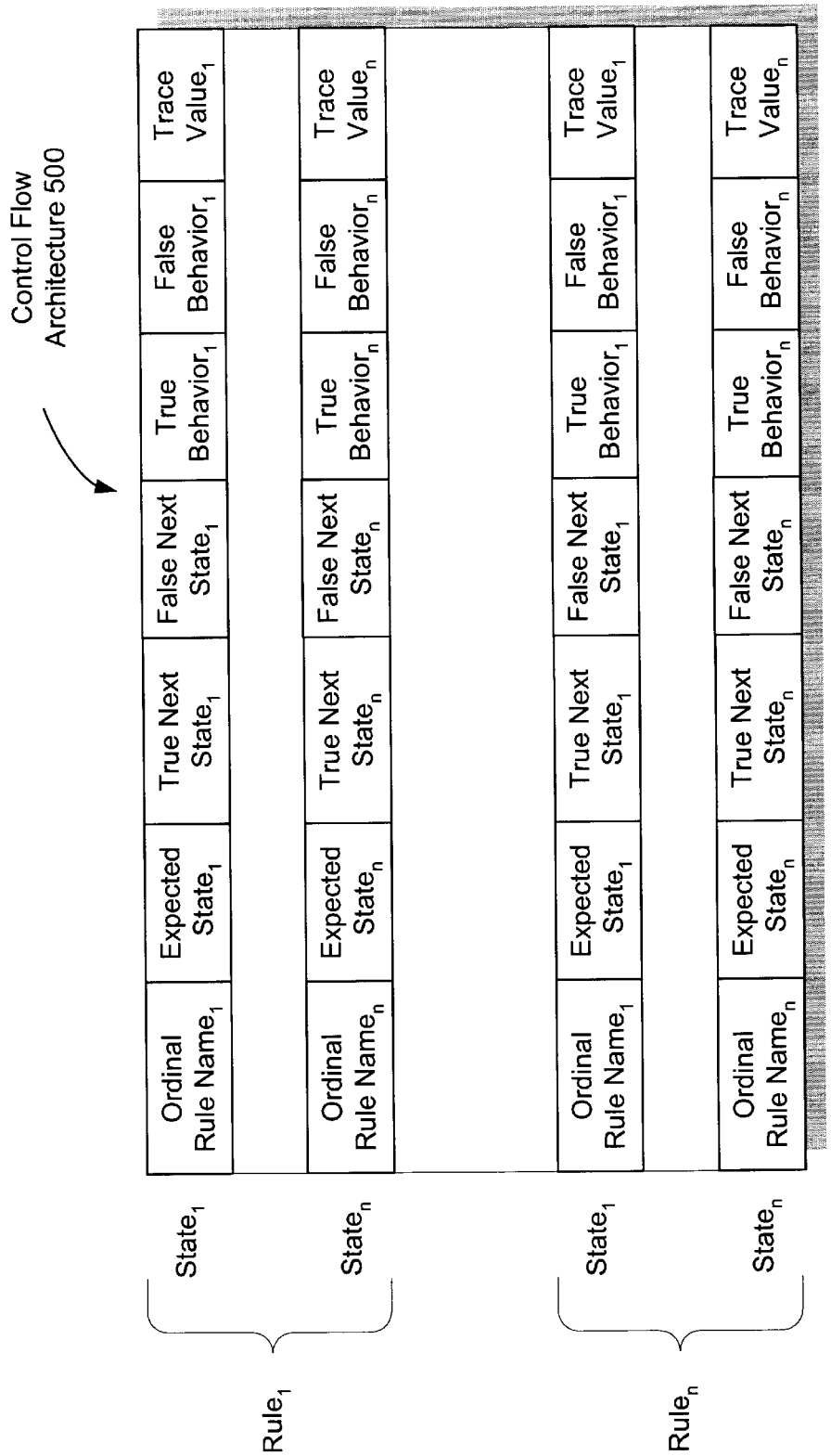
FIG. 5A conceptually illustrates control flow information components according to one embodiment of the present invention.

FIG. 5A conceptually illustrates control flow information components according to one embodiment of the present invention. According to this example, the control flow architecture 510 is represented as a plurality of rules. The rules may be contained in any of a number of possible data structures. For example, the rules may be stored as elements of a multi-dimensional lookup table or may be distributed among two or more lookup tables. Importantly, the table entries themselves may be simple or complex data types. Alternatively, the rules may be stored as part of a database of relational information, such as a relational database.

In any event, each rule in turn may be represented as a collection of one or more states. The state defines possible behaviors and subsequent states. According to the embodiment depicted, each state has seven attributes: (1) an ordinal rule name, (2) an expected state, (3) a true next state, (4) a false next state, (5) a true behavior, (6) a false behavior, and (7) a trace value. The ordinal rule name is a unique ordinal identifier which identifies the position of the rule in the control flow architecture 510 and facilitates human-readability of the data structure or structures containing the control flow information.

The expected state is a state which the execution of the software program is expected to achieve before the true behavior will be carried out. Evaluation of the rule includes evaluating the relationship between the expected state and the current status of the execution of the software program.

The true next state identifies the next ordinal rule to which the software program should transition if evaluation of the rule is true. The false next state identifies the next ordinal rule to which the software program should transition if evaluation of the rule is false.

The true behavior identifies the action or behavior that is to be carried out if the rule evaluation is true. The false behavior identifies the action or behavior that is to be carried out if the rule evaluation is false. Preferably, the actions or behaviors comprise subroutine calls or method invocations to routines which perform the desired actions. In addition, an attempt is made to keep parameter passing to a minimum. Preferably, no parameter data is passed in subroutine calls or method invocations. Rather, as discussed further below, to minimize the coupling among subroutines or methods, data is communicated by way of the class structure.

The trace value provides information about the execution of each state/rule. This trace information may be used if tracing of state transitions is desired, typically for debugging or performance analysis. When tracing is activated (an execution option), the control flow engine captures the trace information associated with each state to which a transition is made. Importantly, this method of trace implementation obviates the need for tracing tools, and thereby eliminates the potential to perturb the software program when tracing is in effect.

It is contemplated that several alternative organizational formats of the control flow information may be employed. Therefore, the organization of the control flow information, in terms of the number of attributes, ordering of the attributes, the meaning and content of the attributes, distribution of attributes among various data structures, etc., may be other than that depicted in the examples herein.

Figure 5B:
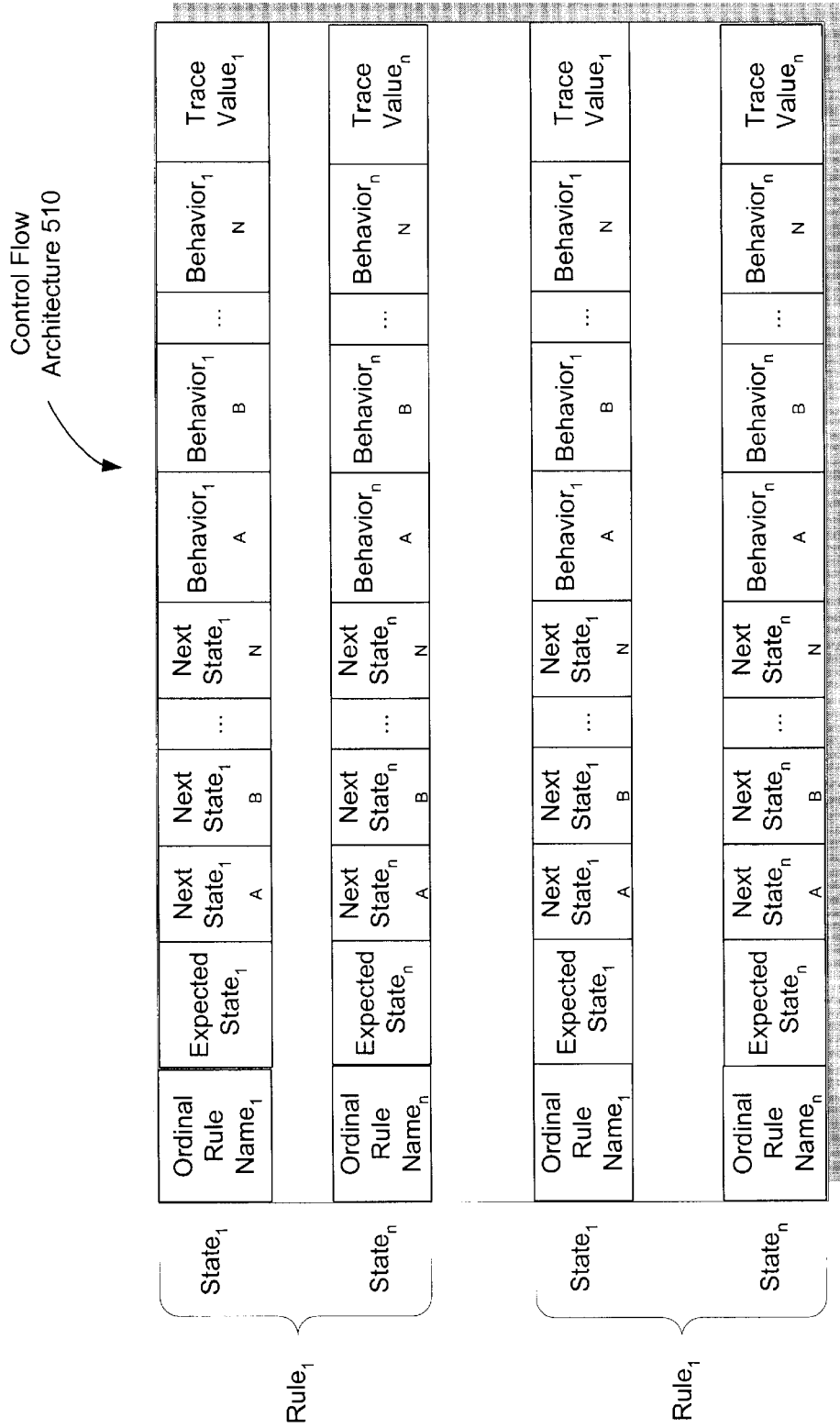
FIG. 5B conceptually illustrates control flow information components according to another embodiment of the present invention.

FIG. 5B illustrates a more generalized view of control flow information of FIG. 5A. In this example, the content of the control flow information is generally the same except that N different next states are possible and N different behaviors are possible. For example, a tri-state COTable may include three possible next states, each with a corresponding transition action or behavior.

As will be illustrated, alternative embodiments may exclude various attributes or include additional attributes. For example, trace values may be excluded from a final product after software testing is completed, if tracing is not needed. In addition, specification of desired behavior may be associated with only a subset of possible rule evaluations. For example, a behavior may be associated with either a true evaluation condition or a false evaluation condition, but not both. Other alternative implementations might be motivated by a variety of considerations, such as final object code size or performance.

Exemplary Run-Time Processing

Figure 6:
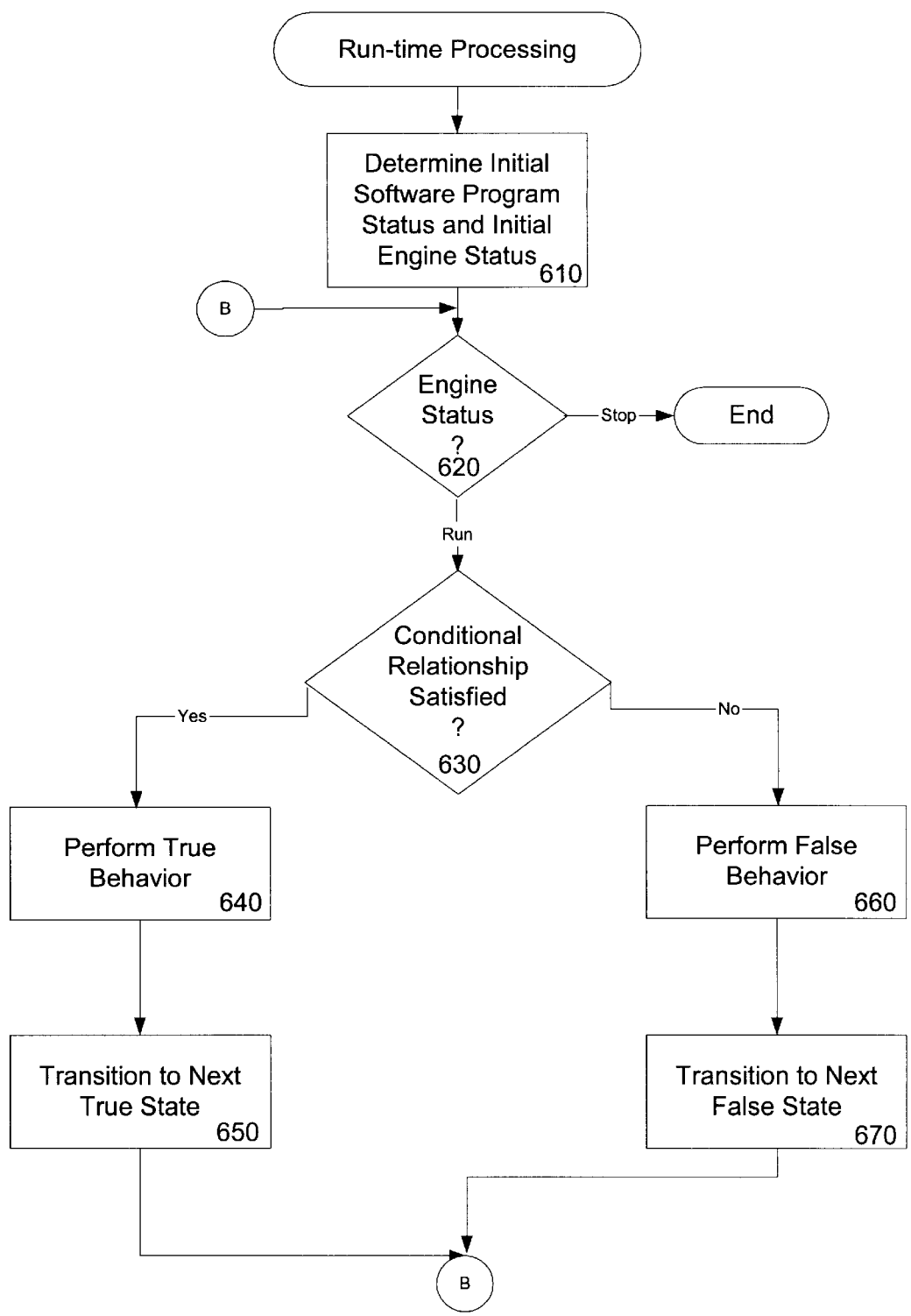
FIG. 6 is a flow diagram illustrating run-time processing according to one embodiment of the present invention.

FIG. 6 is a flow diagram illustrating run-time processing according to one embodiment of the present invention. According to the present example, a control flow engine may direct the execution flow of a software program based upon the current state of execution of the software program and control flow information. As will be emphasized further below, in one embodiment, the control flow engine is context free. That is, the control flow engine is independent of the particular software program that is being directed. In this manner, the same or similar run-time execution engine may be reused with various other sets of control flow information. In one embodiment, the steps described below may be performed under the control of a programmed processor, such as processor 302. However, in alternative embodiments, the steps may be fully or partially implemented by any programmable or hardcoded logic, such as Field Programmable Gate Arrays (FPGAs), TTL logic, or Application Specific Integrated Circuits (ASICs), for example.

At step 610, an initial status of the execution of the software program is determined and initial engine status is determined. According to one embodiment, initialization may be achieved by the caller of the engine. In alternative embodiments, initial status values may be predetermined.

At step 620, the engine status is queried. If the engine status indicates the engine is to continue running, then processing proceeds to step 630. Otherwise, if the engine status indicates the engine is to stop executing, then run-time processing for this engine terminates. Many possible mechanisms are available for terminating the engine. By way of example, the engine may take the form of a loop which continues so long as the engine status satisfies a predetermined conditional relationship. In this manner, one or more of the member functions may signal the engine to terminate by modifying the engine status. Alternatively, an interrupt may be employed to signal the engine. For example, the engine may continue indefinitely until an interrupt handler is triggered by a terminate interrupt.

At step 630, a determination is made if a conditional relationship is satisfied between the current status of execution of the software program and the expected status of the software program. Assuming the control flow information has the form illustrated by FIG. 5A, the value of expected state associated with the current rule/state may be compared to the current status of execution of the software program. According to this example, if the current status is equal to the expected status, then processing continues with step 640; otherwise processing continues with step 660. As should already be apparent with reference to FIG. 5B, the conditional relationship evaluated at step 630 is not limited to choosing one of two branches, such as the yes/no result show in FIG. 6. In alternative embodiments, evaluation of the conditional relationship may select more than two options. For example, the conditional relationship may be expressed as <,=, or >, in which case one of three behaviors could be selected based upon the result.

Returning to the present example, at step 640, the true behavior is performed. Subsequently, during step 650, the software program transitions from the current state to the true next state. Of course, in alternative embodiments, the order of performance of the behavior and the state transition could be interchanged. However, because the behavior might depend upon the current status, it is preferable to transition after the behavior has been completed. It should be noted that the behavior may alter one or both of the engine status and the software program's current execution status. Additionally, the behavior may include modification of the control flow information. In any case, after step 650, processing returns to step 620 where it is determined whether or not to perform another iteration of the engine.

At step 660, the false behavior is performed. Subsequently, during step 670, the software program transitions from the current state to the false next state. As above, in alternative embodiments, the state transition may occur before performing the false behavior. Also, as explained above, the false behavior may include modification of the control flow information. After step 670, processing returns to step 620 where it is determined whether or not to perform another iteration of the engine.

In alternative embodiments, if tracing of state transitions is desired, trace information may additionally be provided in the control flow information for each state. Then, each iteration of the control flow engine, the control flow engine, may capture the trace information associated with each state to which a transition is made. This trace processing may be performed prior to performing the behavior, after performing the behavior and prior to the transition to the next state, or after the transition. Advantageously, in this manner, there is no need for traditional tracing tools, which have the potential to perturb the software program.

Alternative Control Flow Information Representations

FIGS. 7A, 7B, 7C, 7D, and 7E conceptually illustrate control flow information components according to alternative embodiments of the present invention. As the preferred complete set of attributes has been described in detail above with reference to FIGS. 5A and 5B, only the differences will be briefly pointed out.

In the exemplary control flow information representation of FIG. 7A, a two attribute state is employed. Only information indicative of desired behavior is included in the control flow information. If needed, expected state and desired control flow can be maintained elsewhere, such as in the control flow engine or member functions.

FIG. 7B illustrates an alternative subset of control flow information which includes only information indicative of desired true behavior and desired true control flow. This representation may be useful in situations where the desired false behavior is to take no action or situations in which the desired false next state may be represented by a simple expression based upon the current state. For example, the desired false next state may simply be the state stored subsequent to the current state in the COTable.

Figure 7C:
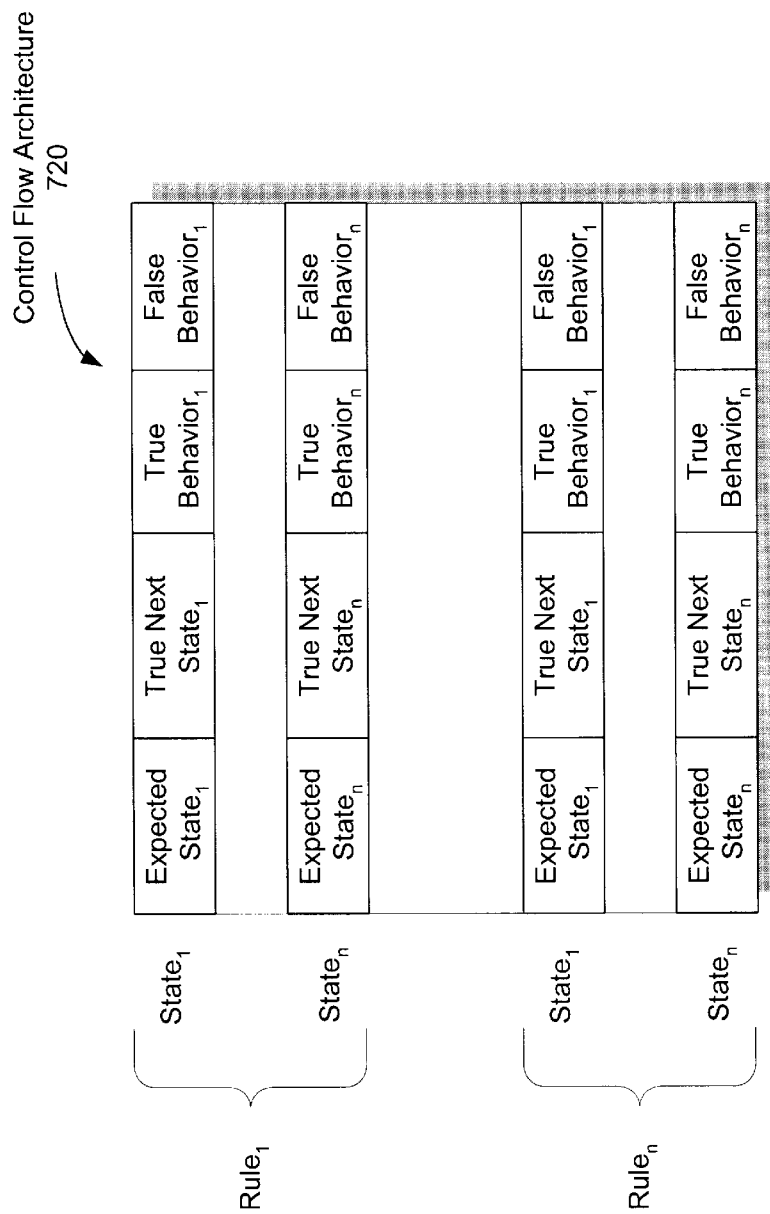

According to the example of FIG. 7C, state attributes include: an expected state, a true next state, a true behavior, and a false behavior. As in the example of FIG. 7B, the false next state may be readily determined with reference to a simple expression.

Figure 7D:
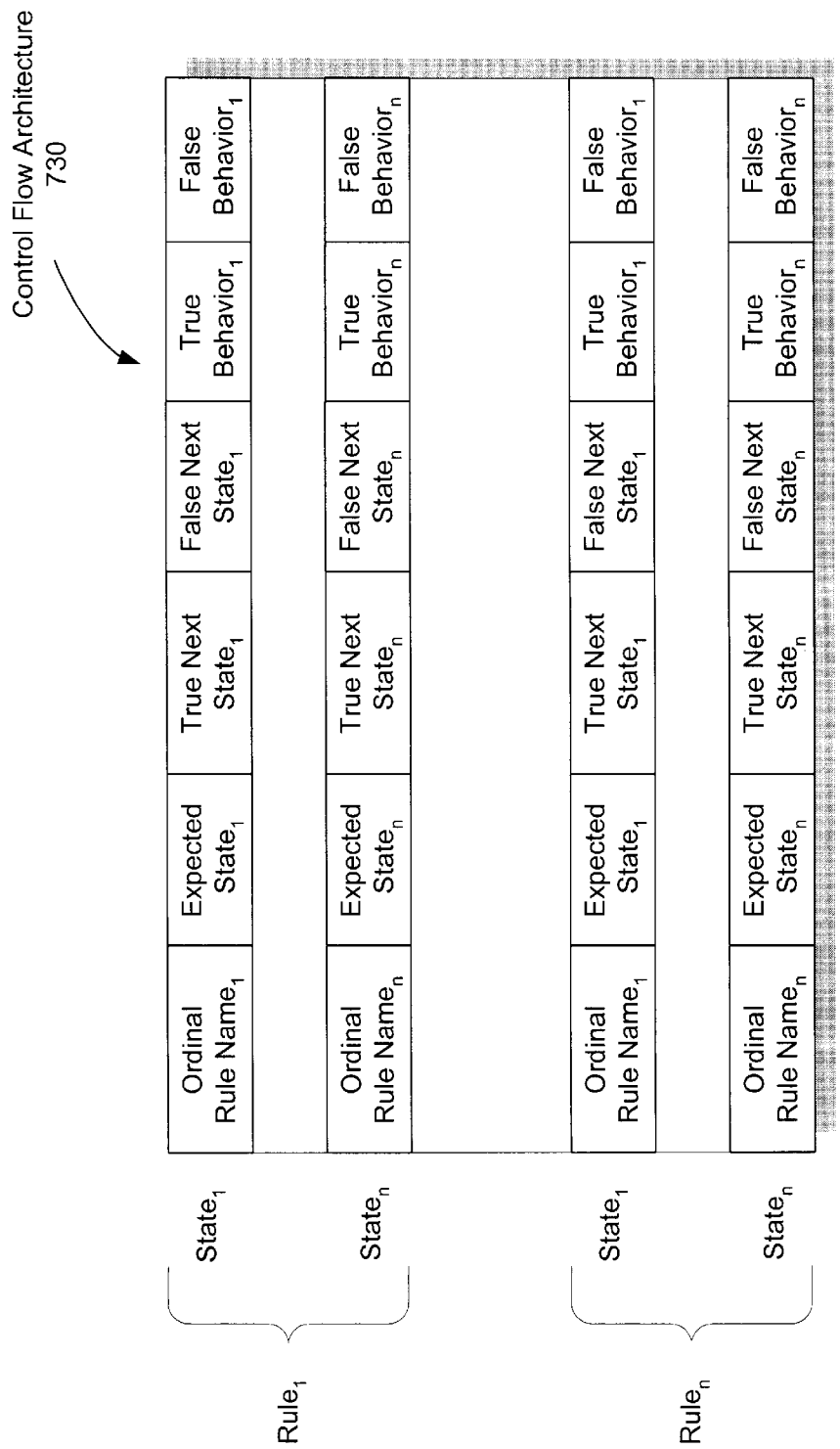

FIG. 7D includes all the state attributes of FIG. 5A with the exception of trace information.

Figure 7E:
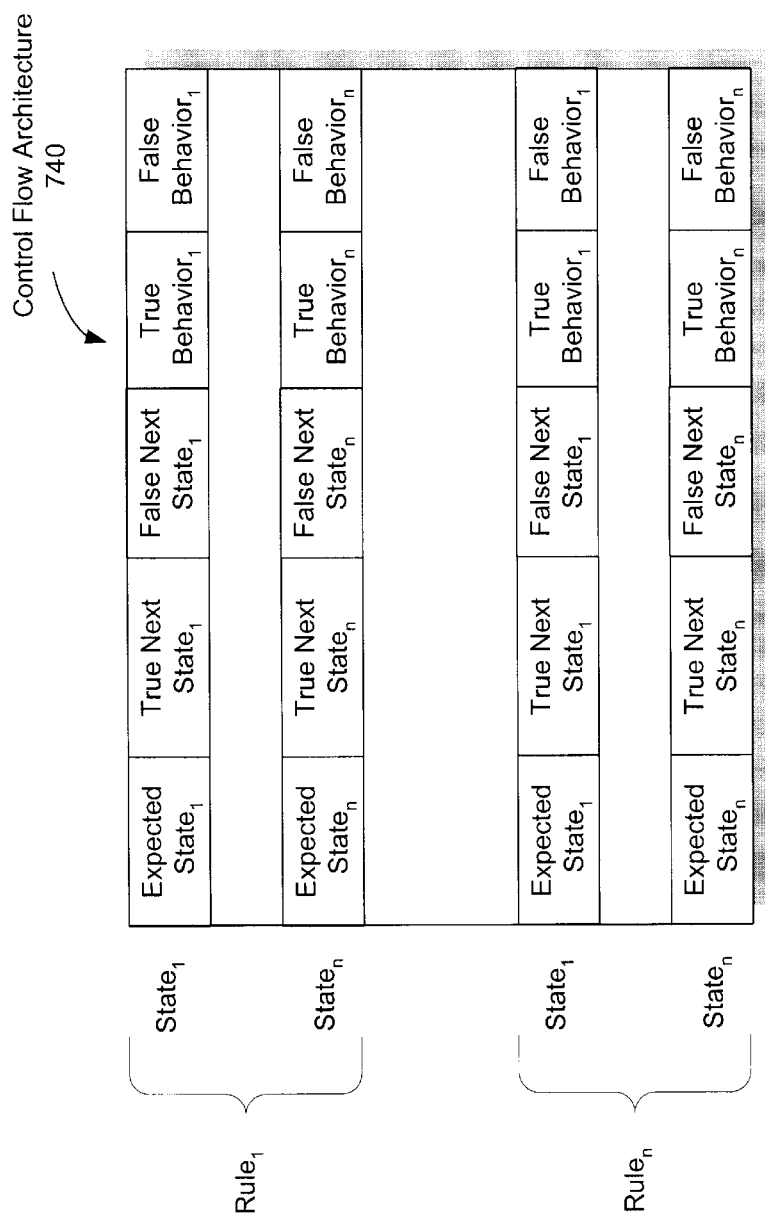

FIG. 7E includes all the state attributes of FIG. 5A with the exception of trace information and the ordinal rule name, which is provided in FIG. 5A merely as a convenience for readability.

Exemplary Table-Based Control Flow Information Implementation

FIG. 8 is an exemplary implementation of control flow information 800 according to one embodiment of the present invention. In this example, the control flow information 800 comprises a two-dimensional table. The table's rows are rules/states and the columns are attributes of the rules/states. Although the order of appearance within the table has been slightly modified, this example includes each of the state attributes described above with reference to FIG. 5A.

One aspect of the present invention illustrated by this example is the novel mechanism employed to initialize an array of dissimilar elements. At line 15, an expansion macro is defined that substitutes what looks to be a function definition with the parameter list of the function. The table, beginning at line 17, is then fooled into believing it comprises an array of functions. Subsequently, however, each occurrence of:

Cs(<Rule>,<State>,<TMemr>, <TRule>,<FMem>,<FRule>, <TraceVal>)

is replaced with:

<Rule>, <State>,$address_1$,$address_2$, $address_3$, $address_4$, <TraceVal>

Where: $address_1$, is the address of the true member function that performs the true behavior; $address_2$ is the address/ index of the true next state to which the software program transitions after determining that the expected state meets a predetermined relationship with the current state of execution of the software program; $address_3$ is the address of the false member function that performs the false behavior; and $address_4$ is the address/index of the false next state to which the software program transitions after determining that the expected state does not meet the predetermined relationship with the current state of execution of the software program. Importantly, the addresses are automatically calculated during the macro expansion as a result of this novel table definition. Advantageously, as will be discussed further below, control flow information defined in this manner allows run-time modification of the software program's control flow without the need for recompilation and additionally allows execution out of the executable software program's data segment.

According to the embodiment depicted, naming conventions seek to improve the readability and understandability of the structure and logic of the software program. In addition, the novel naming conventions help avoid naming conflicts. As a result, the naming conventions are expected to facilitate automated code generation. In this example, there is consistency in the prefixes of names of variables, objects, states, etc. Table 1 illustrates the meaning of the particular prefixes according to the present example.

TABLE 1

Exemplary Naming Convention

| Prefix | Meaning |
| --- | --- |
| i | Special interface cursors |
| m | Member functions |
| n | Constants |
| o | Ordinal control flow definitions |
| q | SQL or other Database related definitions |
| r | Rule definitions |
| s | State definitions |
| v | Reserved Words |
| x | Lexicons and atomics |
| y | Syntax rules and definitions |
| z | Unknown types or generated by application |

Although correct software can be generated without adhering to strict naming conventions, such software tends to be more difficult to maintain and modify.

Evolution of a Control Flow Engine

The exemplary control flow engine illustrated in the code listing of Table 2 consists of loop control and status testing of the current state. As an example, a single loop control with a single status test is shown in the next section, although these are not to be limited, and are dictated by the problem to be solved. An important aspect to understand about COSA control flow engines, to maximize coherency, the control flow engine should replace all control flow if-then-else and switch-case statements. Preferably, if-then-else statements and switch-case statements are only included in control flow engines. In this manner, all of the logic and all of the traversal code is handled by the control flow engines and the control flow information, e.g., the Coherent Object Table. The following engine replaces more lines of code than there are rows in the COTable, on a typical large project this can mean the reduction of several thousand lines of code.

According to the example depicted by Table 2, the Engine State (line 1) is initialized to true to start the engine running. Engine is an element of this class and can be turned off by any appropriate member function and depending on how Engine is inherited it may be turned off by sibling objects. The Rule name (line 3) is initially set to zero or a valid value created by the parent of this object engine. Status (line 3) is similar to Engine when it comes to access privileges, the application will dictate these privileges. Status may be determined and set within each member function for use by the control flow engine during the next Status vs. State test. The True Function (line 5) is called when the Status is equal to the State for this Rule name. Upon return for the true member, the next Rule name (line 6) is selected from the current True Rule name. When Status is not equal to the current Rule name State, the else condition is executed and the process continues until the Engine is turned off by one of the terminating member functions.

TABLE 2

Simple Control Flow Engine

```
1   while(Engine)                                    // Loop Control (while or for)
2   {
3     if(Status == Table[Rule_Name].sState)         // State Testing
                                                     (if or switch)
4     {
5       Table[Rule_Name].True_Function( );          // Do when true
6       Rule_Name =                                  // Do this next
          Table[Rule_Name].True_Rule_Name;
7     }
8     else                    // Alternate (else or case statements)
9     {
10      Table[Rule_Name].False_Function( );         // Do when false
11      Rule_Name =                                  // Do this next
          Table[Rule_Name].False_Rule_Name;
12    }
13  }
```

In the prior art, control flow logic that is context dependent (e.g., related to the particular application) is used to make the decision about whether an execution path will be taken or not. However, according to the preferred COSA implementation, control flow decisions are made by the main loop, the control flow engine, or passed to a subordinate engine. That is, application specific information is sought to be removed from the engine.

This next section will describe how most code is written today. However, the code will be placed in the context of a basic preferred control flow engine format. In this manner, the ad hoc code's actions may be more easily compared and contrasted to the COSA implementation and the evolution to COSA will be made more clear.

TABLE 3

Typical "Spaghetti Code" of Today (presented as a control flow engine)

```
1   while(Engine){
2     if(SStatus == SState){
3       True member[Rule_Name]function( );
4       Rule_Name = Hit_Rule_Name[Rule_Name];  // com-
                                                puted goto
5     } else {
6       Rule_Name ++;
7     }
8   }
```

Inside the mechanism for stopping the process (the while engine is true) the Status is tested to see if it is equal to the State, if that is true, then the True member function is executed at this rule name and the next rule name pointer is setup. If the Status is not equal to the State, then the next rule name pointer skips to the next sequential rule name. Line 6 of the code fragment of Table 3 limits this kind of coding to the cascade in the model when the expected state is false.

Line 4 in the code fragment is equivalent to a <goto> Statement allowing the code traversal to other than a sequential thread created by line 6. In reality, line 4 provides the index for the next virtual table (v-table) entry.

The code fragment of Table 2 is equivalent in functionality to a coding sequence of if Statements shown in the code fragment of Table 4.

TABLE 4

"Spaghetti Code" Functional Equivalent to the Code Fragment of Table 2

```
1       while(Engine){
2           ord0:   if(sStatus == sState1){
3                       True member function1( );
4                       goto ord2; }
5           ord1:   if(sStatus sState2){
6                       True member function2( );
7                       goto ord7; }
8           ord2:   if(sStatus == sState3){
9                       True member function3( );
10                      goto ord9;
11                  }
12          etc. }
```

By adding a False rule name column as shown in the code fragment of Table 5, line six now allows the model to have a peer alternative control flow but not an associated member function.

TABLE 5

```
1       while(Engine){
2           if(sStatus == sState){
3               True member function( );
4               Rule_Name = True_Rule_Name[Rule_Name];
5           } else {
6               Rule_Name = False_Rule_Name[Rule_Name];
7           }
8       }
```

The additional control provided by adding the False rule name column is to having a 'go to' Statement in every if and else Statement in the traditional traversal code shown in Table 5. The False rule name column is the else goto ordx; Statement.

TABLE 6

"Spaghetti Code" Functional Equivalent to the Code Fragment of Table 5

```
1       while(Engine) {
2           ord0:   if(sStatus == sState1) {
3                       True member function1( );
4                       goto ord2;
5                   } else {
6                       goto ord7; }
7           ord1:   if(sStatus == sState2) {
8                       True member function2( );
9                       goto ord7;
10                  } else {
11                      goto ord4; }
12          ord2:   if(sStatus == sState3) {
13                      True member function3( );
14                      goto ord9;
15                  } else {
16                      goto ord11;
17                  }
18          etc. }
```

While the code fragment of Table 6 provides additional control and better representation with the Cognitive Model it is not complete because there is usually additional work that can be done when a True or False condition exists in a State. To gain the maximum benefit in the False State another column may be added, e.g., False Rule Name.

TABLE 7

```
1       while(Engine){
2           if(sStatus == sState){
3               true member function( );
4               Rule_Name = True_Rule_Name[Rule_Name];
5           } else {
6               false member function( );
7               Rule_Name = False_Rule_Name[Rule_Name];
8           }
9       }
```

This last code fragment in Table 7 allows the model to represent activities that can cascade, proceed or call down to lower levels of activity, and have peer activities that can be executed during the same state.

Exemplary Control Flow Engine Implementation

FIG. 9 is an exemplary implementation of a control flow engine according to one embodiment of the present invention. This example is similar to that described above with reference to the last code fragment in Table 7. However, in addition, rule initialization and initialization of both the software program state and the engine state are performed (lines 2–4). Also, tracing of state transitions is performed (lines 7 and 11). As one feature of the embodiment depicted, the address of the desired member function, i.e., TrueMember or FalseMember, may be dynamically bound during each iteration of the control flow engine 900 at line 8 or 12 depending upon the current status of the execution of the software program, i.e., sToken. The member function addresses in the expressions of lines 8 and 12 are treated like data until these lines are evaluated at run-time. When one of the expressions is evaluated, the address of the appropriate member function is read out of the control flow information 440 into a register and then execution flow of the software program branches to that member function. Some very powerful features result from this form of dynamic binding (execution out of the data segment). For example, the control flow information 440 may be dynamically modified during run-time without the need for recompilation.

Exemplary Member Function Implementations

FIG. 10 illustrates exemplary member functions according to one embodiment of the present invention. As one feature of the present embodiment, an attempt is made to minimize coupling among subroutines or methods by using the class structure to communicate rather than parameter lists. As another feature of the present embodiment, an attempt is made to maximize cohesion by performing related operations within a member function. In this example, member functions perform the strongly related operations of the desired behavior and additionally cause the software program to transition from the current state to the next state.

True Dynamic Binding

Figure 11:
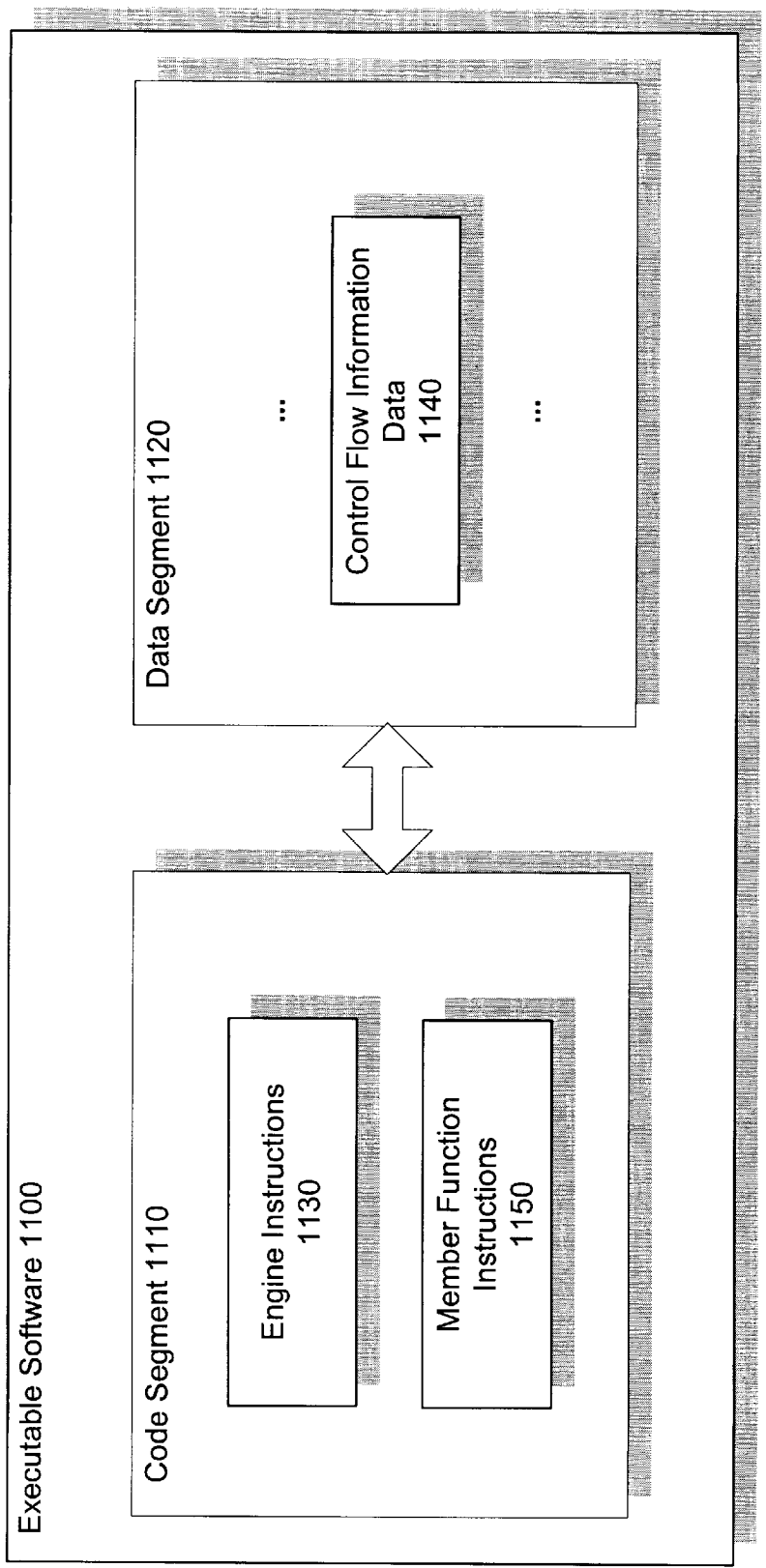
FIG. 11 conceptually illustrates the code and data segments of executable software according to one embodiment of the present invention.

FIG. 11 conceptually illustrates where various program elements reside in the code and data segments 1110 and 1120, respectively, of an executable software program 1100 according to one embodiment of the present invention. Executable software 1100 includes a code segment 1110 and a data segment 1120. The code segment 1110 contains compiled machine instructions in a non-modifiable portion of the executable software's address space. In contrast, the data segment 1120 typically contains data that may be freely updated by the instructions in the code segment 1110. According to one embodiment, the compiled machine instructions, engine instructions 1130 and member function instructions 1150 associated with the control flow engines 430 and the member functions 450, respectively, reside in the code segment 1110. However, the control flow information data 1140 resulting from the compilation of the control flow information 440 is stored in the data segment 1120. As a result, true dynamic binding may be achieved because the control flow engine 430 may execute routines whose addresses are specified as data in the data segment 1120. This means that the software program's execution flow may be dynamically altered during run-time by allowing the control flow engine 440 to effectively execute out of the data segment 1120.

Improved Java Virtual Machine

The final executable software of a COSA application can take many forms. One embodiment is executable object code, generated with an industry-standard code generation tool, such as a C++ compiler, which links the compiled subroutine calls or method invocations with library functions that accomplish the specific actions. An alternative embodiment is the generation of control flow information which includes interpretable subroutine or method references, similar to the pseudo-code of Pascal language compilers or BASIC language interpreters. The control flow engine, then dynamically translates the references to subroutine calls or method invocations within the control flow engine. As an example, in a Java environment, one or more COTables could be translated into Java objects. For its part, the control flow engine could be implemented in Java or any other implementation language.

Another alternative embodiment may include COTable entries that are dynamically linked subroutine calls or method invocations to actual subroutines or methods by the control flow engine. In this embodiment, there is not interpretation in the sense of run-time parsing or token evaluation, which results in performance improvement over existing interpretive execution engines. For example, the assignee of the present invention has implemented a prototype Java virtual machine, the COSA Virtual Machine (CVM). In one embodiment, CVM includes one or more COTables populated with compiled bytecodes (compiled executable code). The COTables may be manually or automatically generated. For example, the COTables may be automatically generated by translating bytecodes into executable code the first time they are encountered and loading them into the one or more COTables. Subsequently, when the same bytecodes are encountered again, the bytecode may be executed from the previously generated executable code in the COTables. In this respect, the CVM may be though of as a "bytecode executer" rather than a typical bytecode interpreter. Consequently, a platform independent virtual machine that runs at compiled speeds may be achieved. An exemplary control flow engine, member functions, and COTable for a CVM is attached in Appendix D. In one embodiment, the CVM may run under the control of a programmed processor, such as processor 302. However, it is contemplated that the CVM may be embodied in an embedded controller comprising a processor and a memory for storing static or dynamically loaded instructions and/or data. Alternatively, the CVM may be fully or partially implemented by any programmable or hardcoded logic, such as Field Programmable Gate Arrays (FPGAs), TTL logic, or Application Specific Integrated Circuits (ASICs), for example.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of controlling the execution of a software program, the method comprising the steps of:

accessing control flow information including a plurality of states associated with the software program, each of the plurality of states including information indicative of desired control flow of the software program, and information indicative of desired behavior of the software program;

determining if a current status of the software program has a predetermined relationship with an expected state of the software program;

causing an action to be performed by the software program based upon the result of the determining step and the information indicative of desired behavior; and causing the software program to transition from a current state to a next state based upon the result of the determining step and the information indicative of desired control flow.

2. The method of claim 1, wherein one or more of the plurality of states, the information indicative of desired control flow and the information indicative of desired behavior are named according to a naming convention that reveals relationships among those of the one or more of the plurality of states, the information indicative of desired control flow and the information indicative of desired behavior that are named according to the naming convention.

3. The method of claim 1, further comprising the step of recording trace information associated with the current status upon entry to or transition from the current state.

4. The method of claim 1, wherein the expected state is specified in a rule of the software program.

5. The method of claim 1, wherein the control flow information comprises a plurality of interrelated lookup tables.

6. The method of claim 1, wherein the control flow information comprises a multi-dimensional lookup table.

7. The method of claim herein the control flow information comprises a database of relational information.

8. The method of claim 1, wherein the step of causing an action to be performed by the software program comprises the steps of:

dynamically binding the address of a member function of the software program with an expression in the control flow engine; and the control flow engine invoking the member function.

9. The method of claim 1, wherein the step of determining if a current status of the software program has a predetermined relationship with an expected state of the software program comprises a control flow engine comparing the current status to the expected state.

10. The method of claim 9, wherein the step of transitioning from the current state to the next state comprises the control flow engine updating the value of the current status.

11. The method of claim 10, wherein the value represents an ordinal position in a data structure associated with the control flow information.

12. The method of claim 9, wherein the step of causing an action to be performed by the software program comprises the control flow engine invoking a member function of the software program through the control flow information.

13. The method of claim wherein the software program includes one or more member functions.

14. The method of claim 13, wherein the step of determining if a current status of the software program has a predetermined relationship with an expected state of the software program comprises a member function of the one or more member functions comparing the current status to the expected state.

15. The method of claim 13, wherein the step of transitioning from the current state to the next state comprises the member function updating the value of the current status.

16. The method of claim 15, wherein the value represents an ordinal position in a data structure associated with the control flow information.

17. The method of claim 13, wherein the method further comprises the step of a member function of the one or more member functions modifying the control flow information.

18. The method of claim 13, wherein the control flow information comprises a virtual table of addresses of the one or more member functions.

19. The method of claim 13, wherein the method further comprises the step of a member function of the one or more member functions setting the current status.

20. The method of claim 1, wherein each of the plurality of states further includes information indicative of the expected state.

21. The method of claim 20, wherein the control flow information comprises a multi-dimensional lookup table.

22. The method of claim 20, wherein the control flow information comprises a database of relational information.

23. The method of claim 1, wherein the action is performed by a single member function of the software program.

24. The method of claim 1, wherein the step of causing an action to be performed by the software program comprises dynamically binding execution flow of the software program to a member function of the software program by reading an address of the member function out of a data segment of the software program.

25. The method of claim 1, wherein the step of causing an action to be performed by the software program comprises making an argument-less call to a member function of the software program.

26. The method of claim 25, wherein the step of causing an action to be performed by the software program is accomplished by making only argument-less calls to one or more member functions of the software program.

27. The method of claim 1, wherein the control flow information includes desired behavior for all possible states of the software program.

28. The method of claim 1, wherein each of the steps are performed within a loop of a control flow engine.

29. The method of claim 28, wherein the loop continues until a signal to terminate is received.

30. The method of claim 28, wherein the loop continues until an interrupt is received.

31. A method of controlling the execution of a software program, the method comprising the steps of:
  accessing control flow information including a plurality of states associated with the software program, each of the plurality of states including information indicative of desired control flow of the software program, and information indicative of desired behavior of the software program;
  a member function associated with the software program determining if a current status of the software program has a predetermined relationship with an expected state of the software program;
  causing an action to be performed by the software program based upon the result of the determining step and the information indicative of desired behavior; and
  causing the software program to transition from a current state to a next state based upon the result of the determining step and the information indicative of desired control flow.

32. The method of claim 31, wherein one or more of the plurality of states, the information indicative desired control flow and the information indicative of desired behavior are named according to a naming convention.

33. The method of claim 32, wherein the naming convention reveals relationships among those of the one or more of the plurality of states, the information indicative of desired control flow and the information indicative of desired behavior that are named according to the naming convention.

34. The method of claim 33, wherein the naming convention facilitates automatic code generation by providing assistance in avoidance of naming conflicts.

35. The method of claim 33, wherein the naming convention facilitates the generation of human-readable code.

36. A method of controlling the execution of a software program, the method comprising the steps of:
  a control flow engine accessing control flow information including a plurality of states associated with the software program, each of the plurality of states including information indicative of desired control flow and desired behavior associated with each of one or more status values that may result from evaluating an expected state associated with a current status of the execution of the software program;
  the control flow engine evaluating the expected state associated with a current status of the execution of the software program;
  causing an action to be performed by the software program based upon the control flow information, the current status, and the result of the step of evaluating; and
  transitioning from a current state to a next state based upon the control flow information, the current status, and the result of the step of evaluating.

37. The method of claim 36, wherein the step of transitioning from the current state to the next state comprises the control flow engine causing the value of the current status to be updated.

38. The method of claim 36, wherein the step of causing an action to be performed by the software program comprises the control flow engine invoking a member function of the software program.

39. The method of claim 38, further comprising the step of the control flow engine dynamically binding the member function to the execution flow of the software program.

40. The method of claim 36, wherein the software program includes one or more member functions, and wherein the step of transitioning from the current state to a next state comprises a member function of the one or more member functions causing the value of the current status to be updated.

41. A method of controlling the execution of a software program, the method comprising the steps of:
  (a) receiving dynamic state information identifying the status of the software program;
  (b) determining if the dynamic state information has a predetermined relationship with static state information, the static state information identifying an expected state of a plurality of possible states of the software program;
  (c) based upon the result of the determining step, causing a first behavior to be carried out by the software program if the predetermined relationship exists by dynamically binding execution flow of the software program to a first routine; otherwise causing a second behavior to be carried out by the software program by dynamically binding execution flow of the software program to a second routine, both the first behavior and the second behavior being capable of modifying the dynamic state information; and (d) based upon the result of the determining step, causing the software program to transition from the current state to a first state if the predetermined relationship exists, otherwise causing the software program to transition from the current state to a second state.

42. The method of claim 41, further comprising the step of accessing control flow information, the control flow information including a plurality of states associated with the software program, each of the plurality of states including the static state information, information indicative of desired control flow of the software program, and information indicative of desired behavior of the software program.

43. The method of claim 41, further comprising the step of a control flow engine repeating steps (b) through (d) until a signal to terminate is received.

44. The method of claim 41, further comprising the step of a control flow engine repeating steps through (d) until an interrupt occurs.

45. The method of claim 41, wherein the control flow engine has access to control flow information including static state information, information indicative of desired control flow of the software program, and information indicative of desired behavior of the software program for each of the plurality of possible states.

46. The method of claim 45, wherein the step of dynamically binding execution flow of the software program to a first routine comprises executing a routine identified by an address located in a data segment of the software program.

47. The method of claim 45, wherein the control flow information comprises a multi-dimensional lookup table.

48. The method of claim 46, wherein the control flow information comprises a plurality of lookup tables.

49. The method of claim 46, wherein the control flow information comprises a database of relational information.

50. The method of claim wherein the control flow information comprises a relational database.

51. The method of claim wherein the step of causing the software program to transition from the current state to a first state if the predetermined relationship exists, otherwise causing the software program to transition from the current state to a second state comprises a control flow engine causing the value of the current state to be updated.

52. The method of claim 41, wherein the software program includes one or more member functions, and wherein the step of causing the software program to transition from the current state to a first state if the predetermined relationship exists, otherwise causing the software program to transition from the current state to a second state comprises a member function of the one or more member functions causing the value of the current status to be updated.

53. A program execution engine for controlling the execution of a software program comprising:

information indicative of desired control flow associated with each of a plurality of possible states associated with the software program;

information indicative of desired behavior associated with each of the plurality of possible states; and a control flow engine that directs the execution of the software program by accessing the information indicative of desired control flow and the information indicative of desired behavior, determining a result of a conditional relationship between a current status of the software program and an expected state of the software program, causing an action to be performed by the software program based upon the result, and causing the software program to transition from a current state to a next state based upon the result.

54. A controller comprising:

a processor configured to execute instructions;

a memory coupled to the processor, the memory having stored therein data representing sequences of instructions of a software program, the sequences of instructions when executed by the processor cause the processor to perform the steps of:

accessing control flow information including a plurality of states associated with the software program, each of the plurality of states including information indicative of desired control flow of the software program, and information indicative of desired behavior of the software program;

determining if a current status of the software program has a predetermined relationship with an expected state of the software program;

causing an action to be performed by the software program based upon the result of the determining step and the information indicative of desired behavior; and causing the software program to transition from a current state to a next state based upon the result of the determining step and the information indicative of desired control flow.

55. The controller of claim 54, wherein the software program includes one or more member functions control flow engine, and the control flow information, the control flow engine configured to direct the execution of the one or more member functions with reference to the control flow information.

56. The controller of claim 55, wherein the memory comprises a read-only memory.

57. The controller of claim 55, wherein the memory is configured to receive dynamically loaded data representing the one or more member functions and the control flow information.

58. The controller of claim 55, wherein the memory is configured to receive dynamically loaded data representing the one or more member functions.

59. The controller of claim 55, wherein the memory is configured to receive dynamically loaded data representing the control flow information.

60. The controller of claim 55, wherein the memory is configured to receive dynamically loaded data representing the one or more member functions, the control flow information and the control flow engine.

61. A method of tracing the execution of a software program, the method comprising the steps of:

accessing control flow information including a plurality of states associated with the software program, each of the plurality of states including information indicative of desired control flow of the software program, information indicative of desired behavior of the software program, and trace information;

determining if a current status of the software program has a predetermined relationship with an expected state of the software program;

causing an action to be performed by the software program based upon the result of the determining step and the information indicative of desired behavior;

causing the software program to transition from a current state to a next state based upon the result of the determining step and the information indicative of desired control flow; and causing the trace information to be recorded prior or subsequent to the transition from the current state to the next state.

62. A method of controlling the execution of a software program, the method comprising the steps of:
   (a) receiving dynamic state information identifying the status of the software program;
   (b) determining if the dynamic state information has a predetermined relationship with static state information, the static state information identifying an expected state of a plurality of possible states of the software program;
   (c) based upon the result of the determining step, causing one of a plurality of behaviors to be carried out by the software, any of which are capable of modifying the dynamic state information; and
   (d) based upon the result of the determining step, causing the software program to transition from the current state to one of the plurality of possible states.

63. The method of claim 62, further comprising the step of accessing control flow information, the control flow information including a plurality of states associated with the software program, each of the plurality of states including the static state information, information indicative of desired control flow of the software program, and information indicative of desired behavior of the software program.

64. The method of claim 62, further comprising the step of a control flow engine repeating steps (b) through (d) until a signal to terminate is received.

65. The method of claim 62, further comprising the step of a control flow engine repeating steps (b) through (d) until an interrupt occurs.

66. The method of claim 62, wherein the step of causing one of a plurality of behaviors to be carried out by the software comprises the step of a control flow engine invoking one of a plurality of routines.

67. The method of claim 66, wherein the control flow engine has access to control flow information including static state information, information indicative of desired control flow of the software program, and information indicative of desired behavior of the software program for each of the plurality of possible states.

68. The method of claim 67, wherein the control flow information comprises a multi-dimensional lookup table.

69. The method of claim 67, wherein the control flow information comprises a plurality of lookup table.

70. The method of claim 67, herein the control flow information comprises a database of relational information.

71. The method of claim 62, wherein the step of causing the software program to transition from the current state to one of the plurality of possible states comprises a control flow engine causing the value of the current state to be updated.

72. The method of claim 62, wherein the software program includes one or more member functions, and wherein the step of causing the software program to transition from the current state to one of the plurality of possible states comprises a member function of the one or more member functions causing the value of the current status to be updated.

* * * * *